Patented Aug. 27, 1929.

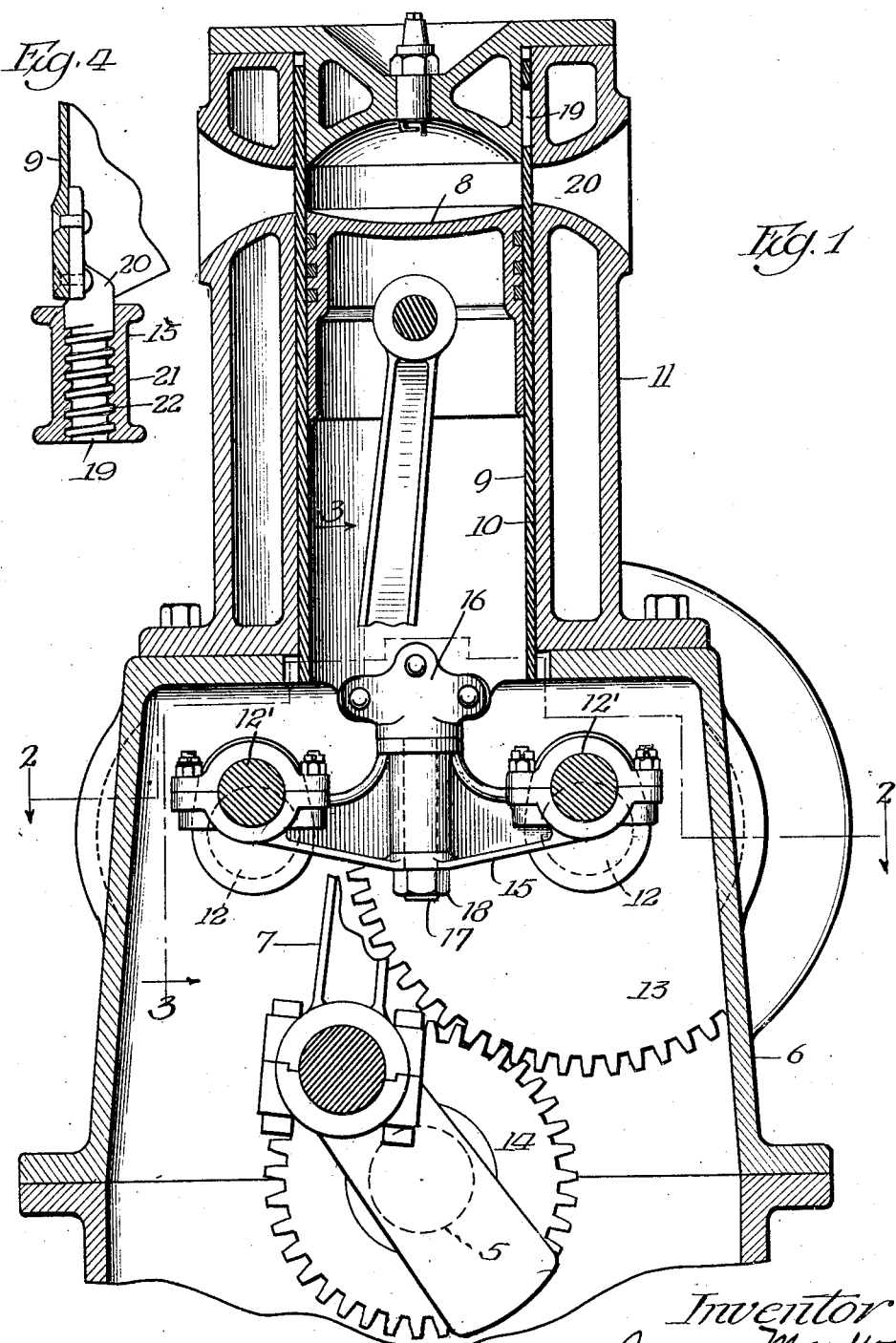

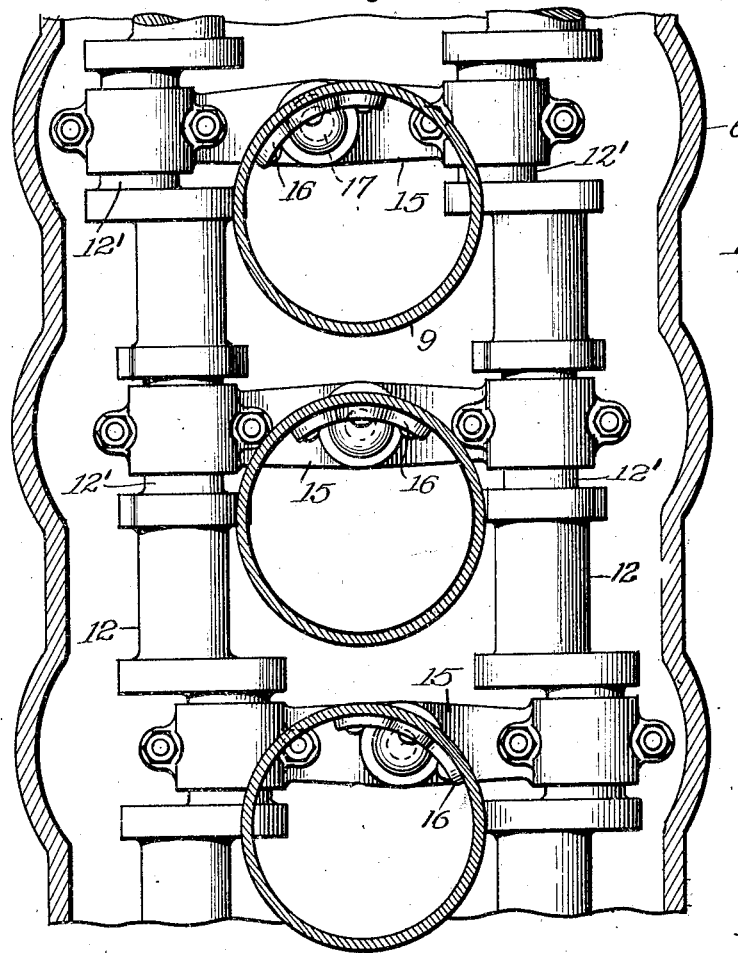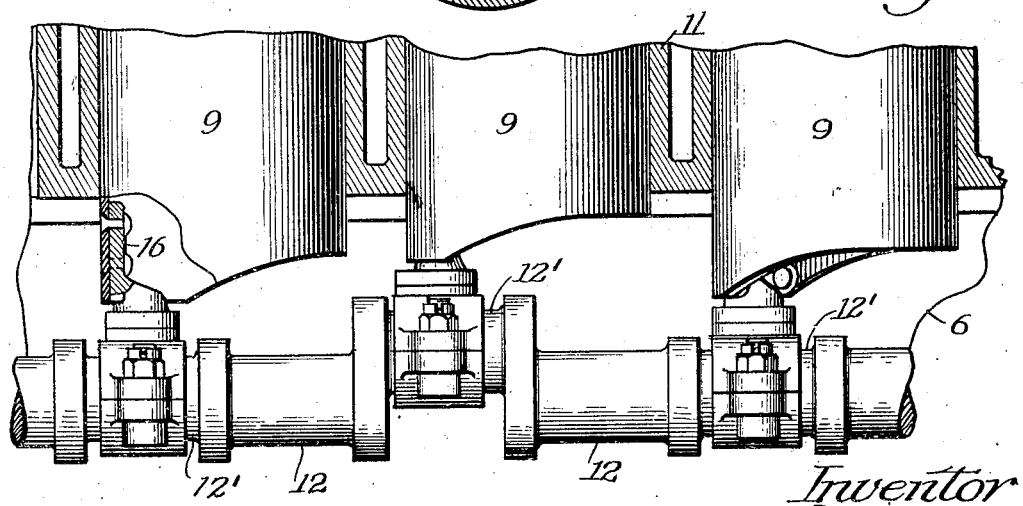

1,725,989

UNITED STATES PATENT OFFICE.

JAMES MARKOE, OF HARVEY, ILLINOIS.

GAS ENGINE.

Application filed August 26, 1926. Serial No. 131,586.

This invention relates to single sleeve valve gas engines and its object is to impart a desirable combined longitudinal and circular reciprocating motion to the sleeve of each cylinder by novel and improved means of simple but substantial construction and efficient operation.

Also, the invention has for its object, to impart the desired motion to the sleeve valve of a single sleeve gas engine in a novel manner and by novel means whereby the sleeve is accurately operated and the efficiency of the engine is materially increased.

And a further object of the invention is to drive a pair of auxiliary crank shafts from the main crank shaft of the engine and to transfer the circular motion from these auxiliary crank shafts to the sleeves in a direct line and more efficiently than if this motion was transferred in an angular direction or through the medium of gears.

In the accompanying drawings I have illustrated the invention in a simple embodiment and referring thereto:

Fig. 1 is a vertical sectional view through one cylinder of an engine embodying the invention.

Fig. 2 is a sectional view on the line 2—2 of Fig. 1.

Fig. 3 is a sectional view on line 3—3 of Fig. 1.

Fig. 4 is a detail sectional view of a modification.

Referring to the drawings 5 is the main crank shaft supported in bearings in the casing 6 and operating the connecting rod 7 which reciprocates the piston 8 in the sleeve 9 which is arranged in the cylinder 10 of the water-cooled block 11. The parts so far described are common to single sleeve engines and may be embodied in different forms to produce the same general result, and my invention is capable of adaptation thereto in the form illustrated or in some equivalent form. Two auxiliary crank shafts 12—12 are mounted in suitable bearings in the casing on opposite sides of the center of the cylinder and at least one of these shafts is provided with a gear 13 which meshes with a gear 14 on the main crank shaft whereby the auxiliary shafts are driven from the main crank shaft. The auxiliary crank shafts are arranged in parallel relation and are provided with oppositely disposed corresponding cranks 12'. A cross piece 15 is loosely engaged at its ends with a pair of cranks on the auxiliary crank shafts so that the cranks may turn in the cross piece while the cross piece travels with the cranks and is capable of a slight movement lengthwise of the cranks. There will be one pair of cranks on the auxiliary crank shafts and one cross piece for each cylinder and sleeve, and the cross piece is connected with the sleeve by a swivel connection which comprises a bracket 16 fastened to the lower edge of the sleeve, on the inside thereof, and provided with a spindle 17 which projects through the cross piece 15 and is threaded to receive a nut 18. Thus a swivel connection is provided between the lower end of the sleeve at the peripheral edge thereof and the cross piece mid-way between the centers of the cranks on the auxiliary crank shafts to which the cross piece is attached. The sleeve is provided with one or more ports 19 to register with ports or passages 20 in the engine block and the position of the swivel connection on the sleeve will be determined by reference to the position of the ports and passages and may be varied as found desirable in different embodiments of the invention.

In practice the main crank shaft drives one of the auxiliary crank shafts through direct gearing and this auxiliary crank shaft drives the other auxiliary crank shaft through the cross piece connections. Through the cross piece with its swivel connection to the edge of the sleeve, the cranks of the auxiliary crank shafts impart a longitudinal reciprocating movement to the sleeve and a circular reciprocating movement to the sleeve, and these two movements being combined produce a desired valve action of the sleeve which is timed and adjusted according to the requirements of the particular embodiment. The circular reciprocating motion of the sleeve through the swivel connection to the cross piece requires that the cross piece shall be capable of a slight secondary reciprocating motion lengthwise of the cranks and the cranks are of sufficient length for this purpose and the cross piece has a sliding fit with the cranks to accommodate itself by a movement longitudinal of the auxiliary crank shafts to the circular movement imparted by it to the sleeve.

My invention provides a simple means for imparting desired movements to the sleeve and for transferring the motion of the auxiliary crank shafts directly to the sleeve in an efficient manner.

Various means may be employed for connecting the cross piece with the sleeve, the simple swivel bracket of Figs. 1–3 being satisfactory for the purpose. If it is found desirable to provide considerable thrust surface I may employ the construction shown in Fig. 4 wherein the spindle 19 of the bracket 20 is threaded to engage the threaded opening 21 of the cross piece 22. This construction corresponds substantially with that previously described except that the threads provide an enlarged thrust engagement between the cross piece and the bracket. Other changes may be made in the construction and arrangement of parts to adapt the invention to different installations, and for other purposes, and I reserve the right to make all such changes as fall within the scope of the accompanying claim.

I claim:

A single sleeve gas engine comprising a cylinder, a sleeve in said cylinder, a main crank shaft disposed below said cylinder, a pair of crank shafts between said cylinder and said main crank shaft, a cross piece positioned directly below the wall of said sleeve and engaged at its ends with said pair of crank shafts and having a sliding fit thereon for movement longitudinally of the crank shaft, a gear on said main crank shaft, a gear on one of said pair of crank shafts and meshing with said other gear for imparting motion to said pair of crank shafts, a bracket fixed to the lower edge of said sleeve, on the inside thereof, and a spindle on said bracket and extending directly downwardly within the confines of the circumference of said sleeve and through said cross piece and having rotary movement with respect to said cross piece.

JAMES MARKOE.